United States Patent
Pye et al.

(10) Patent No.: US 11,113,596 B2
(45) Date of Patent: Sep. 7, 2021

(54) SELECT ONE OF PLURALITY OF NEURAL NETWORKS

(71) Applicant: LONGSAND LIMITED, Cambridge (GB)

(72) Inventors: David Pye, Cambridge (GB); Christopher Waple, Cambridge (GB)

(73) Assignee: Longsand Limited

( * ) Notice: Subject to any disclaimer, the term of this patent is extended or adjusted under 35 U.S.C. 154(b) by 928 days.

(21) Appl. No.: 15/574,083

(22) PCT Filed: May 22, 2015

(86) PCT No.: PCT/EP2015/061470
§ 371 (c)(1),
(2) Date: Nov. 14, 2017

(87) PCT Pub. No.: WO2016/188558
PCT Pub. Date: Dec. 1, 2016

(65) Prior Publication Data
US 2018/0300610 A1    Oct. 18, 2018

(51) Int. Cl.
G06N 3/04       (2006.01)
G06N 7/00       (2006.01)
G06N 3/08       (2006.01)
G06N 3/10       (2006.01)

(52) U.S. Cl.
CPC ............. *G06N 3/0454* (2013.01); *G06N 3/08* (2013.01); *G06N 3/10* (2013.01); *G06N 7/005* (2013.01)

(58) Field of Classification Search
CPC .......... G06N 3/0454; G06N 3/08; G06N 3/10; G06N 7/005
See application file for complete search history.

(56) References Cited

U.S. PATENT DOCUMENTS

| | | | |
|---|---|---|---|
| 8,126,710 B2 | 2/2012 | Gemello et al. | |
| 8,442,821 B1 | 5/2013 | Vanhoucke | |
| 2002/0116187 A1 | 8/2002 | Erten | |
| 2009/0216528 A1 | 8/2009 | Gemello et al. | |
| 2016/0328644 A1* | 11/2016 | Lin et al. ................ | G06N 3/08 |

OTHER PUBLICATIONS

Frazao et al., "Weighted Convolutional Neural Network Ensemble", 2014, CIARP 2014, LNCS 8827, pp. 674-681 (Year: 2014).*
Bengio Yoshua Ed. Pedro Campos et al. Practical Recommendations for Gradient-Based Training of Deep Architectures. Jan. 1, 1901. Grid and Cooperative Computing—GCC 2004: Third International Conference, Wuhan, China, Oct. 21-24, 2004, IN: Lecture Notes in Compuer Science, ISSN 0302-9743; vol. 3251.
James Bergstra et al, Algorithms for Hyper-Parameter Optimization, Neural Information Processing Systems Nips Proceedings 2011. Dec. 31, 2011. XP055168492 p. 1-p. 7.

(Continued)

*Primary Examiner* — Kamran Afshar
*Assistant Examiner* — Brent Johnston Hoover

(57) ABSTRACT

Data is input to one of a plurality of neural networks. Each of the plurality of neural networks is to be of a different size. A propagation time is determined for the inputted data. The propagation time relates to a time for the inputted data to propagate through one of the plurality of neural networks. One of the plurality of neural networks is selected based on the propagation time.

20 Claims, 2 Drawing Sheets

(56) References Cited

OTHER PUBLICATIONS

Phillip Verbancsics et al. Generative NeuroEvolution for Deep Learning. Dec. 18, 2013, pp. 1-9, XP055243286.
Trishul Chilimbi et al. ,Project Adam: Building, an Efficent and Scalable Deep Learning Training System. Proceedings of the 11th Usenix Symposium on Operating Systems Design and Implementation. Oct. 6, 2014, pp. 571-582, XP055243209.
Zhao, R. et al., "Variable-component Deep Neural Network for Robust Speech Recognition," (Research Paper), Interspeech, Jun. 20, 2014, 5 pages.
International Searching Authority., International Search Report and Written Opinion dated Feb. 1, 2016 for PCT Application No. PCT/EP2015/061470 Filed May 22, 2015, 14 pages.

* cited by examiner

SELECT ONE OF PLURALITY OF NEURAL NETWORKS

BACKGROUND

With the recent improvements in recognition technology, such as speech and image recognition technology, speech and image recognition technologies are being increasingly applied to a diverse array of audio, image and video content. Providers of such recognition technology are challenged to provide increasingly more accurate translation for their clients.

BRIEF DESCRIPTION OF THE DRAWINGS

The following detailed description references the drawings, wherein.

DETAILED DESCRIPTION

Figure 1:
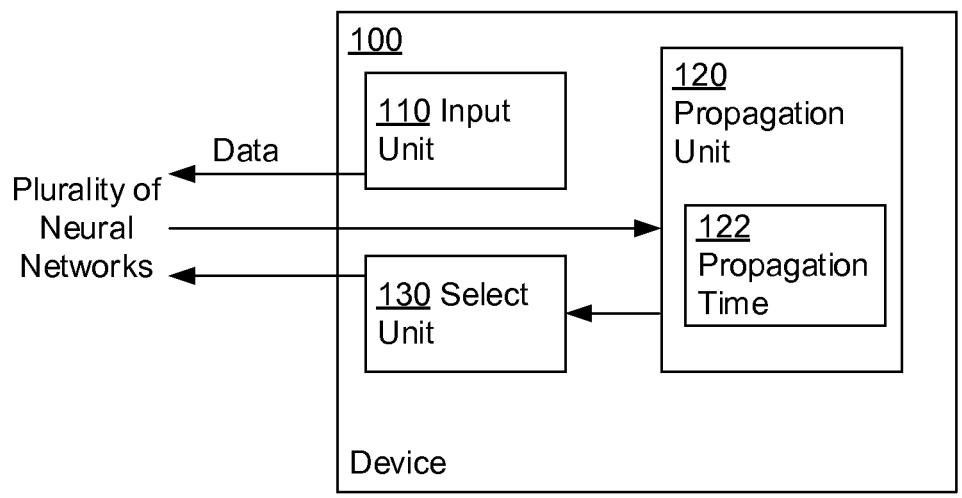
FIG. 1 is an example block diagram of a device to select one of a plurality of neural networks.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

The recent emergence of deep learning architectures such as deep or convolutional neural networks has improved speech-to-text performance. These neural networks may come in many shapes and sizes. If however the speech-to-text is being run in a time critical manner, this can lead to a difficult choice in determining the optimal structure of the Neural Network. To improve utility of hardware and/or throughput, speech recognition is often constrained to run in real-time or even faster. If the neural network is too large, then too little (or no) time may remain for the subsequent stages of recognition to perform well. If the neural network is too small, then its discriminative power may be reduced.

The factors for determining the optimal or improved size may be numerous and can vary with time (e.g. CPU usage, audio quality, network traffic). A neural network suited to a modern processor with single instruction, multiple data (SIMD) parallelism acceleration may be too slow in propagation for a deployment with an older, slower processor and could fail to keep up with the target processing rate. Typically therefore, it may be necessary to select a conservatively smaller neural network to cater for a worst case scenario. This however may cause recognition accuracy to suffer, particularly in the best case scenario with good audio, powerful hardware and no rival processes or network problems.

Examples may choose between two or more neural networks of different sizes that share the same input and output layer structure. A larger neural network may perform better when recognition time is not a factor. A smaller neural network may be sufficiently small to allow for faster than real-time recognition. Examples may seamlessly switch from among the two or more neural networks into the recognition process as appropriate. For instance, a decision may be about which neural network to select at a given time on an audio frame-by-frame basis, or less frequently if desired. The decision of which neural network to use may be based on recognition process analytics. Such analytics may consider an amount of time spent in neural network propagation compared to a target recognition speed or by seeing whether the recognition process is ahead of or behind schedule.

In one example, a device may include an input unit, a propagation unit and a select unit. The input unit may input data to one of a plurality of neural networks. Each of the plurality of neural networks may be of a different size. The propagation unit may determine a propagation time for the inputted data. The propagation time may relate to a time for the inputted data to propagate through one of the plurality of neural networks. The select unit may select one of the plurality of neural networks based on the propagation time.

Thus, examples may choose the neural network based on the environment and desired recognition speed. It may be possible to avoid therefore having to choose the smallest neural network to cover a worst-case scenario and thereby reducing recognition accuracy. In addition, the automated process of selecting between various neural networks as the recognition progresses may eliminate the need to make a hard decision over an appropriate network for the task. As process analytics are used, it may be possible to ensure the most appropriate neural network is chosen at all times throughout the recognition process. For example, if the process is proceeding relatively fast, then a more accurate network may be used instead, and vice versa. This may increase the likelihood that the best possible recognition accuracy is achieved in the time available.

Referring now to the drawings, FIG. 1 is an example block diagram of a device 100 to select one of a plurality of neural networks. The device 100 may include or be part of a microprocessor, a controller, a memory module or device, a notebook computer, a desktop computer, an all-in-one system, a server, a network device, a wireless device, an audio device and the like.

The device 100 is shown to include an input unit 110, a propagation unit 120 and a select unit 130. The input, recognition and select units 110, 120 and 130 may include, for example, a hardware device including electronic circuitry for implementing the functionality described below, such as control logic and/or memory. In addition or as an alternative, the input, propagation and select units 110, 120 and 130 may be implemented as a series of instructions encoded on a machine-readable storage medium and executable by a processor.

The input unit 110 may input data to one of a plurality of neural networks. Each of the plurality of neural networks may be of a different size. The propagation unit 120 may determine a propagation time 122 for the inputted data. The propagation time 122 may relate to a time for the inputted data to propagate through one of the plurality of neural networks. The select unit 130 may select one of the plurality of neural networks based on the propagation time 122. The device 100 is explained in greater detail below with respects to FIGS. 2-4.

Figure 2:
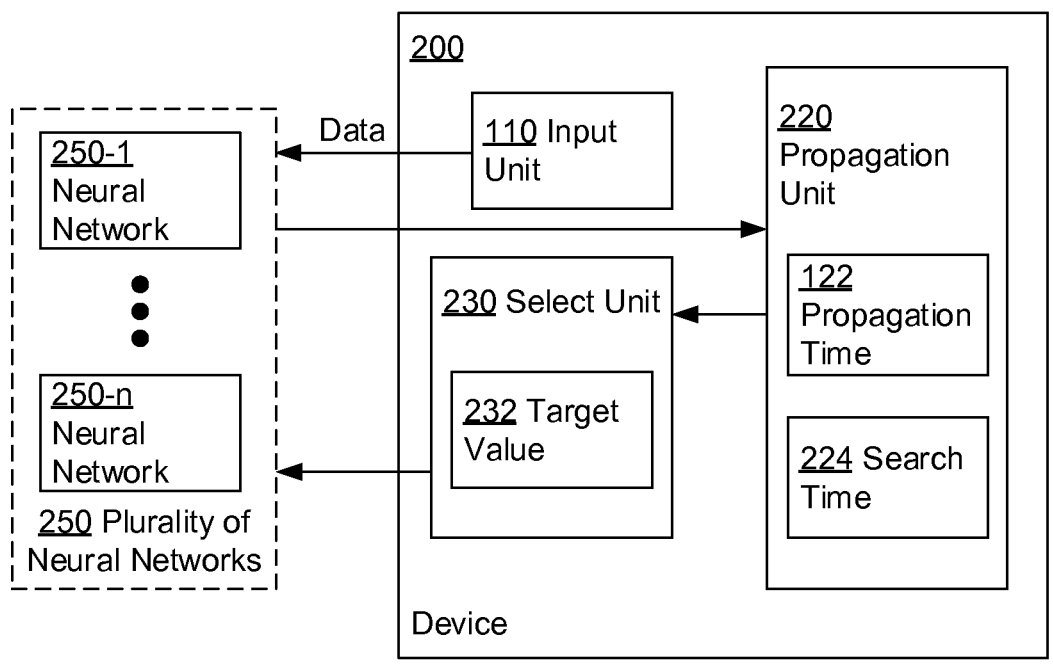
FIG. 2 is another example block diagram of a device to select one of a plurality of neural networks.

FIG. 2 is another example block diagram of a device 200 to select one of a plurality of neural networks. The device 200 may include or be part of a microprocessor, a controller, a memory module or device, a notebook computer, a desktop computer, an all-in-one system, a server, a network device, a wireless device, an audio device and the like.

The device 200 of FIG. 2 may include at least the functionality and/or hardware of the device 100 of FIG. 1. For example, device 200 of FIG. 2 includes the input unit 110, a propagation unit 220 and a select unit 230. The propagation and select units 220 and 230 of the device 200 of FIG. 2 may respectively include at least the functionality and/or hardware of the propagation and select units 120 and 130 of the device 100 of FIG. 1.

As noted above, the input unit 110 may input data to one of a plurality of neural networks 250-1 to 250-$n$, where n is a natural number. The data may be divided into a plurality of units of data, such as frames. The input unit 110 may input the data into the selected neural network 250 on a unit-by-unit basis. The selected neural network may process one unit of data at a time, where a remainder of inputted may be queued. The plurality of neural networks 250-1 to 250-$n$ may include, for example, a hardware device including electronic circuitry for implementing the functionality described below, such as control logic and/or memory. In addition or as an alternative, the plurality of neural networks 250-1 to 250-$n$ may be implemented as a series of instructions encoded on a machine-readable storage medium and executable by a processor.

A neural network or artificial neural network (ANN) may refer to a family of statistical learning models inspired by biological neural networks (the central nervous systems of animals, in particular the brain) and may be used to estimate or approximate functions that can depend on a large number of inputs and may be generally unknown. Neural networks may generally presented as systems of interconnected "neurons" which send messages to each other. The connections may have numeric weights that can be tuned based on experience, making neural networks adaptive to inputs and capable of learning.

There are inter-connections between the neurons in the different layers of each neural network. An example neural network may have three layers. A first layer may have input neurons which send data via synapses to a second layer of neurons, and then via more synapses to a third layer of output neurons. More complex neural networks may have more layers of neurons with some having increased layers of input neurons and output neurons. The synapses may store parameters called "weights" that manipulate the data in the calculations.

A neural network may generally be defined by three types of parameters: 1) the interconnection pattern between the different layers of neurons; 2) the learning process for updating the weights of the interconnections; and 3) the activation function that converts a neuron's weighted input to its output activation. For example, a neural network for voice recognition may be defined by a set of input neurons which may be activated by the pixels of an input audio. After being weighted and transformed by a function (determined by the network's designer), the activations of these neurons are then passed on to other neurons.

This process is repeated until finally, an output neuron is activated that determines a posterior probability for a plurality of outputs, such as outputs related to spoken phonemes, letters, syllables or words. The plurality of neural networks 250-1 to 250-$n$ may also aid in transcribing to text other types of data, such as image data for computer vision. Examples types of neural networks 250 may include deep and convolutional neural networks. Here, the plurality of neural networks 250-1 to 250-$n$ may output a plurality of posterior probabilities. Each of the posterior probabilities may to relate to a probability of a corresponding output for the inputted data.

In FIG. 2, each of the plurality of neural networks 250-1 to 250-$n$ may be of a different size. However, the plurality of neural networks 250-1 to 250-$n$ have a same number of input nodes a same number of output nodes. Yet, the plurality of neural networks 250-1 to 250-$n$ may have a different number of hidden layer nodes. For instance, in a general neutral network 250, a 429 node input layer may be followed by 2-6 hidden layers and an output layer of 4000 corresponding to the states of a hidden Markov model (HMM).

In one example, a largest neural network 250 may have 429 input nodes (or neurons), 5*1536 hidden layer nodes and 4000 output nodes. An example midsize neural network 250 may have 429 input nodes, 4*1024 hidden layer nodes and 4000 output nodes. Further, an example smaller neural network 250 may have 429 input nodes, 2*768 hidden layer nodes and 4000 output nodes.

The propagation unit 220 may determine a propagation time 122 for the inputted data. The propagation time 122 may relate to a time for the inputted data to propagate through one of the plurality of neural networks 250-1 to 250-$n$. The propagation unit 220 may continuously update the propagation time 122 to include a sum of the propagation times for all of the inputted data that has propagated through one of the neural networks 250-1 to 250-$n$.

The select unit 230 may select one of the plurality of neural networks 250-1 to 250-$n$ based a comparison of the propagation time 122 to a search time 224. The search time 224 may relate to an amount of time used in a recognition process to transcribe the inputted data after the inputted has propagated through one of the plurality of neural networks 250-1 to 250-$n$. For instance, the selected neural network 250 may output one or more posterior probabilities in response to the inputted data. The search time 224 may relate to a time to search for a term (such as a phoneme, letter, syllable, word, etc.) in response to the outputted one or more posterior probabilities that may be output as a transcription of the inputted data.

As noted above the data may be divided into units. Also, the propagation time 122 and/or search time 224 may be updated continuously, such as on a unit-by-unit basis or every time interval (like $\frac{1}{100}$ of a second). For example, the propagation time 122 and search times 224 may initially be zero. After a first unit of data propagates through one of the plurality of neural networks 250-1 to 250-$n$, its time of propagation may be added to the propagation time. Similarly, a time to search for a transcription term for the first unit of data, after the first unit of data has propagated through one of the plurality of neural networks 250-1 to 250-$n$, may be added to the search time 224.

This process may be repeated for subsequent units of data. For instance, after a fifth unit of data propagates through one of the plurality of neural networks 250-1 to 250-$n$, the propagation time 122 would include a sum of the propagation times for five units of data. Also, after the fifth unit of data is transcribed as part of the recognition process, the search time 232 would include a sum of the search times for five units of data.

In one instance, the select unit 230 may calculate a ratio based on the propagation time 122 and the search time 224. For example, the select unit 230 may add the propagation time 122 and the search time 224 to calculate a total time. Then, the select unit 230 may calculate the ratio by dividing the propagation time 122 by the total time. Further, the select unit 230 may select one of the plurality of neural networks 250-1 to 250-$n$ based on a comparison of the calculated ratio to one or more target values 232.

For example, the select unit 230 may switch to a smaller neural network 250 of the plurality of neural networks 250-1 to 250-$n$ if the calculated ratio is greater than one or more of the target values 232. On the other hand, the select unit 230 may switch to a larger neural network 250 of the plurality of neural networks 250-1 to 250-$n$ if the calculated ratio is less than one or more of the target values 232. Further, the select unit 230 may switch to a midsize neural network 250 having a size between the smaller and larger neural networks 250 if the calculated ratio is between at least two of the one or more of the target values 232.

For instance, assume that the one or more of the target values 232 include the values "0.5" and "0.8". In this case, the smaller neural network 250 may be selected if the calculated ratio is greater than 0.8. Conversely, the larger neural network 250 may be selected if the calculated ratio is less than 0.5. Further, the midsize neural network 250 may be selected if the calculated ratio is between 0.5 and 0.8.

Initially, the select unit 230 may initially select a midsize neural network 250 of the plurality of networks 250-1 to 250-$n$ if the propagation time 224 has not yet been determined by the propagation unit 220. The select unit 230 may select a largest neural network 250 of the plurality of networks 250-1 to 250-$n$ if one or more of the target values 232 have not yet been determined.

The outputs of the neural network propagation may be scaled to produce state posteriors (the sum of all outputs is 1.0). This may help ensure stability in seamlessly switching between neural networks, on a frame-by-frame basis if necessary, without disruptively affecting the recognition process. The posterior probability may be the probability of one or more parameters given the evidence, such as the inputted data.

The larger neural network 250 of the plurality of neural networks 250-1 to 250-$n$ may more accurately determine the posterior probabilities than a smaller neural network 250 of the plurality of neural networks 250-1 to 250-$n$. Conversely, the smaller neural network 250 may determine the posterior probabilities in less time than the larger neural network.

Thus, examples may improve or maximize performance of recognition of data (such as speech recognition) in a time-constrained manner. Examples may prevent having to choose an overly-small neural network and thereby accepting poorer accuracy, to guard against a larger dataset taking too long in real-time operation in the worst-case scenario. Examples may select the most appropriate neural network on a continuous basis as the recognition progresses. If a recognition process is going well, but suddenly network problems/competing processes interfere midway through, examples may still ensure the most appropriate neural network is used at each stage to improve or maximize accuracy.

Figure 3:
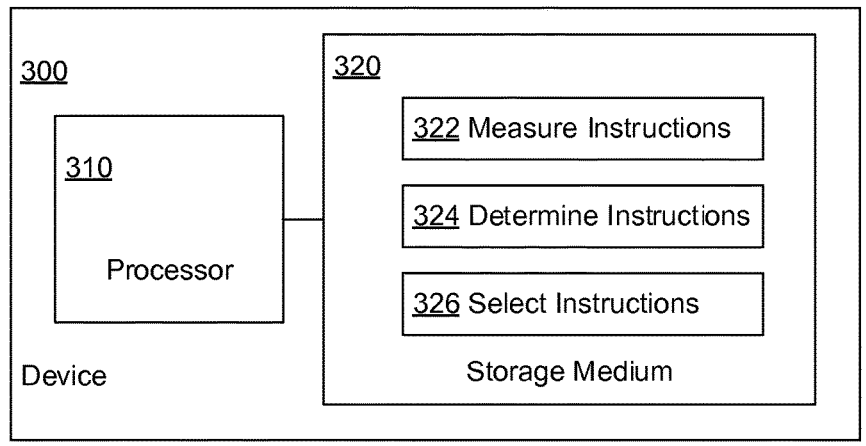
FIG. 3 is an example block diagram of a computing device including instructions for selecting one of a plurality of neural networks.

FIG. 3 is an example block diagram of a computing device 300 including instructions for selecting one of a plurality of neural networks. In the embodiment of FIG. 3, the computing device 300 includes a processor 310 and a machine-readable storage medium 320. The machine-readable storage medium 320 further includes instructions 322, 324 and 326 for selecting one of a plurality of neural networks.

The computing device 300 may be included in or part of, for example, a microprocessor, a controller, a memory module or device, a notebook computer, a desktop computer, an all-in-one system, a server, a network device, a wireless device, or any other type of device capable of executing the instructions 322, 324 and 326. In certain examples, the computing device 300 may include or be connected to additional components such as memories, controllers, microphones etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322, 324 and 326 to implement selecting one of the plurality of neural networks. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for selecting one of the plurality of neural networks.

Figure 4:
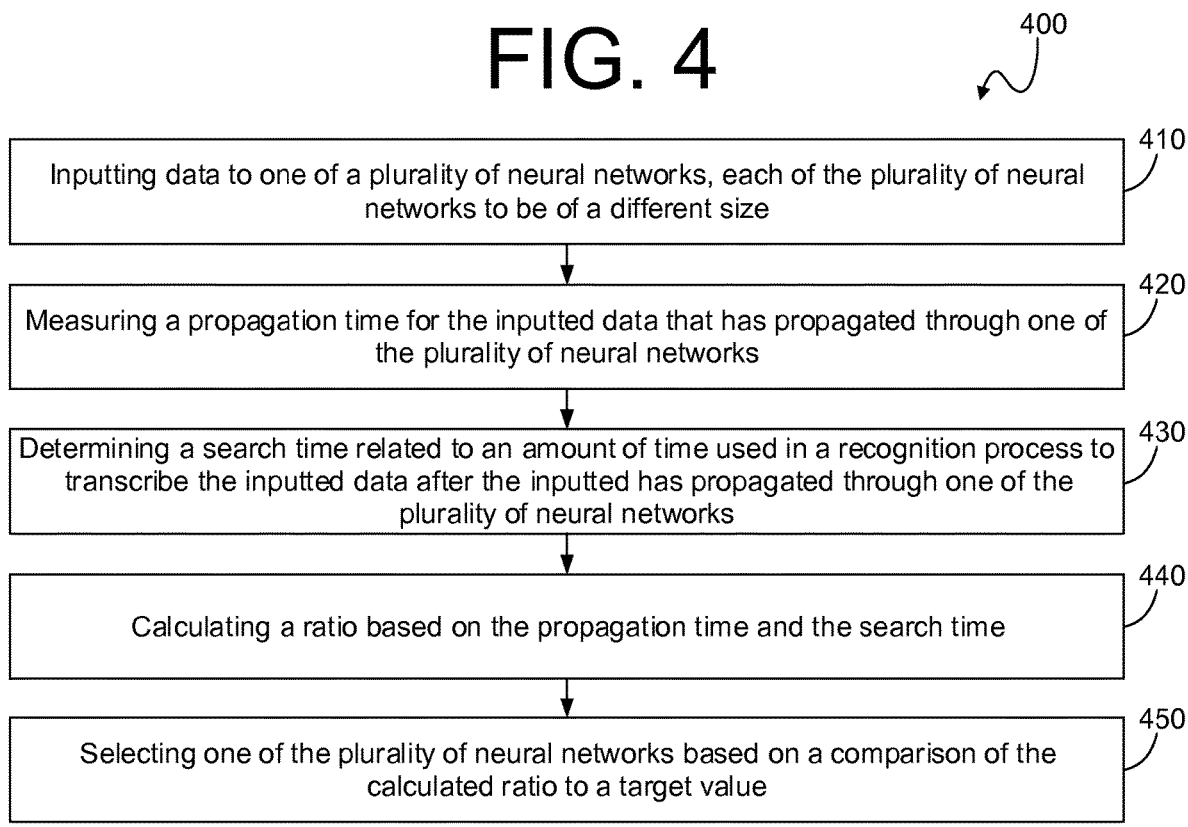
FIG. 4 is an example flowchart of a method for selecting one of a plurality of neural networks.

Moreover, the instructions 322, 324 and 326, when executed by a processor (e.g., via one processing element or multiple processing elements of the processor) can cause the processor to perform processes, such as, the process of FIG. 4. For example, the measure instructions 322 may be executed by the processor 310 to measure a propagation time for data to propagate through one of a plurality of neural networks. Each of the plurality of neural networks may be of a different size. The time to for the data to propagate may be measured continuously for each of a plurality of neural networks.

The determine instructions 324 may be executed by the processor 310 to determine a search time related to an amount of time used in a recognition process to transcribe the data after the data has propagated through one of the plurality of neural networks. The select instructions 326 may be executed by the processor 310 to select one of the plurality of neural networks based on the propagation time and the search time. For example, a ratio may be determined based on the propagation time and the search time. One of the plurality of neural networks may be selected based on a comparison of the ratio to a target value.

FIG. 4 is an example flowchart of a method 400 for selecting one of a plurality of neural networks. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 410, the device 200 inputs data to one of a plurality of neural networks 250-1 to 250-n. Each of the plurality of neural networks 250-1 to 250-n may be of a different size. At block 420, the device 200 measures a propagation time 122 for the inputted data that has propagate through one of the plurality of neural networks 250-1 to 250-n. Then, at block 430, the device 200 determines a search time 232 related to an amount of time used in a recognition process to transcribe the inputted data after the inputted has propagated through one of the plurality of neural networks 250-1 to 250-n.

At block 440, the device 200 calculates a ratio based on the propagation time 122 and the search time 224. The calculating at block 440 may be carried out continuously. Lastly, at block 450, the device 200 selects one of the plurality of neural networks 250-1 to 250-n based on a comparison of the calculated ratio to a target value 232. The selecting at block 450 may continuously switch between the plurality of neural networks 250-1 to 250-n based on the comparison.

We claim:

1. A device, comprising:
an input unit that provides input data to one of a plurality of neural networks, each of the plurality of neural networks to be of a different size;
a propagation unit that determines a propagation time for the input data, the propagation time to relate to a time for the input data to propagate through one of the plurality of neural networks; and
a select unit that selects the one of the plurality of neural networks based on a comparison of the propagation time to a second time that comprises an amount of time used to transcribe the input data after the input data has propagated through the one of the plurality of neural networks.

2. The device of claim 1, wherein,
the propagation unit continuously updates the propagation time to include a sum of propagation times for all of the input data that has propagated through the one of the plurality of neural networks.

3. The device of claim 2, wherein,
the select unit calculates a ratio based on the propagation time and the second time, and
the select unit selects the one of the plurality of neural networks based on a comparison of the calculated ratio to one or more target values.

4. The device of claim 3, wherein,
the select unit switches to a smaller neural network of the plurality of neural networks if the calculated ratio is greater than one or more of the target values,
the select unit switches to a larger neural network of the plurality of neural networks if the calculated ratio is less than one or more of the target values, and
the select unit switches to a midsize neural network having a size between the smaller and larger neural networks if the calculated ratio is between at least two of the one or more of the target values.

5. The device of claim 4, wherein,
the select unit initially selects the midsize neural network if the propagation time has not been determined by the propagation unit, and
the select unit selects a largest neural network of the plurality of neural networks if one or more of the target values have not been determined.

6. The device of claim 4, wherein,
the input data is divided into a plurality of units of data, and
the input unit inputs the plurality of units of data into the selected one of the plurality of neural networks on a unit-by-unit basis.

7. The device of claim 6, wherein,
the propagation unit measures a time for each of the plurality of units of data to propagate through one of the neural networks,
the propagation unit continuously adds the measured times for the plurality of units of data to propagate through one of the neural networks to the propagation time,
the propagation unit continuously updates a search time to include a sum of second times for the units of data that have propagated through one of the neural networks.

8. The device of claim 1, wherein,
the plurality of neural networks output a plurality of posterior probabilities in relation to the input data, and
each of the posterior probabilities are to relate to a probability for a different corresponding output for the input data.

9. The device of claim 8, wherein,
a larger neural network of the plurality of neural networks more accurately determines the posterior probabilities than a smaller neural network of the plurality of neural networks, and
the smaller neural network determines the posterior probabilities in less time than the larger neural network.

10. The device of claim 1, wherein,
the plurality of neural networks have a same number of input nodes and a same number of output nodes, and
the plurality of neural networks have a different number of hidden layer nodes.

11. The device of claim 1, wherein,
the input data includes at least one of an image and audio,
the plurality of neural networks aid in transcribing the at least one of the audio and image to text, and
the plurality of neural networks comprise at least one of deep and convolutional neural networks.

12. A method, comprising:
providing input data to one of a plurality of neural networks, each of the plurality of neural networks being a different size;
measuring a propagation time for the input data that has propagated through one of the plurality of neural networks;
determining a second time related to an amount of time used to transcribe the input data after the input data has propagated through the one of the plurality of neural networks;
calculating a ratio based on the propagation time and the second time; and
selecting the one of the plurality of neural networks based on a comparison of the calculated ratio to a target value.

13. The method of claim 12, wherein,
the calculating comprises continuously updating the ratio, and
the selecting comprises continuously selecting between the plurality of neural networks based on the comparison.

14. The method of claim 12, wherein,
the plurality of neural networks have a same number of input nodes and a same number of output nodes, and
the plurality of neural networks have a different number of hidden layer nodes.

15. The method of claim 12, wherein, the input data includes at least one of an image and audio, the plurality of neural networks aid in transcribing the at least one of the audio and image to text, and the plurality of neural networks comprise at least one of deep and convolutional neural networks.

16. The method of claim 12, wherein, the plurality of neural networks output a plurality of posterior probabilities in relation to the input data, and each of the posterior probabilities relate to a probability for a different corresponding output for the input data.

17. The method of claim 12, wherein the input data is divided into a plurality of units of data that are provided into the selected one of the plurality of neural networks on a unit-by-unit basis.

18. A non-transitory computer-readable storage medium storing instructions that, if executed by a processor of a device, cause the processor to:

measure a propagation time for data to propagate through one of a plurality of neural networks, where each of the plurality of neural networks is a different size;

determine a second time that comprises an amount of time used to transcribe the data after the data has propagated through one of the plurality of neural networks; and select the one of the plurality of neural networks based on the propagation time and the second time.

19. The non-transitory computer-readable storage medium of claim 18, wherein, a ratio is determined based on the propagation time and the second time, and the one of the plurality of neural networks is selected based on a comparison of the ratio to a target value.

20. The non-transitory computer-readable storage medium of claim 18, wherein, the data includes at least one of an image and audio, and the plurality of neural networks aid in transcribing at least one of the image and audio to text.

* * * * *